Oct. 11, 1960 E. U. COHLER ET AL 2,956,272
DIGITAL TO ANALOG CONVERTER
Filed Sept. 12, 1957
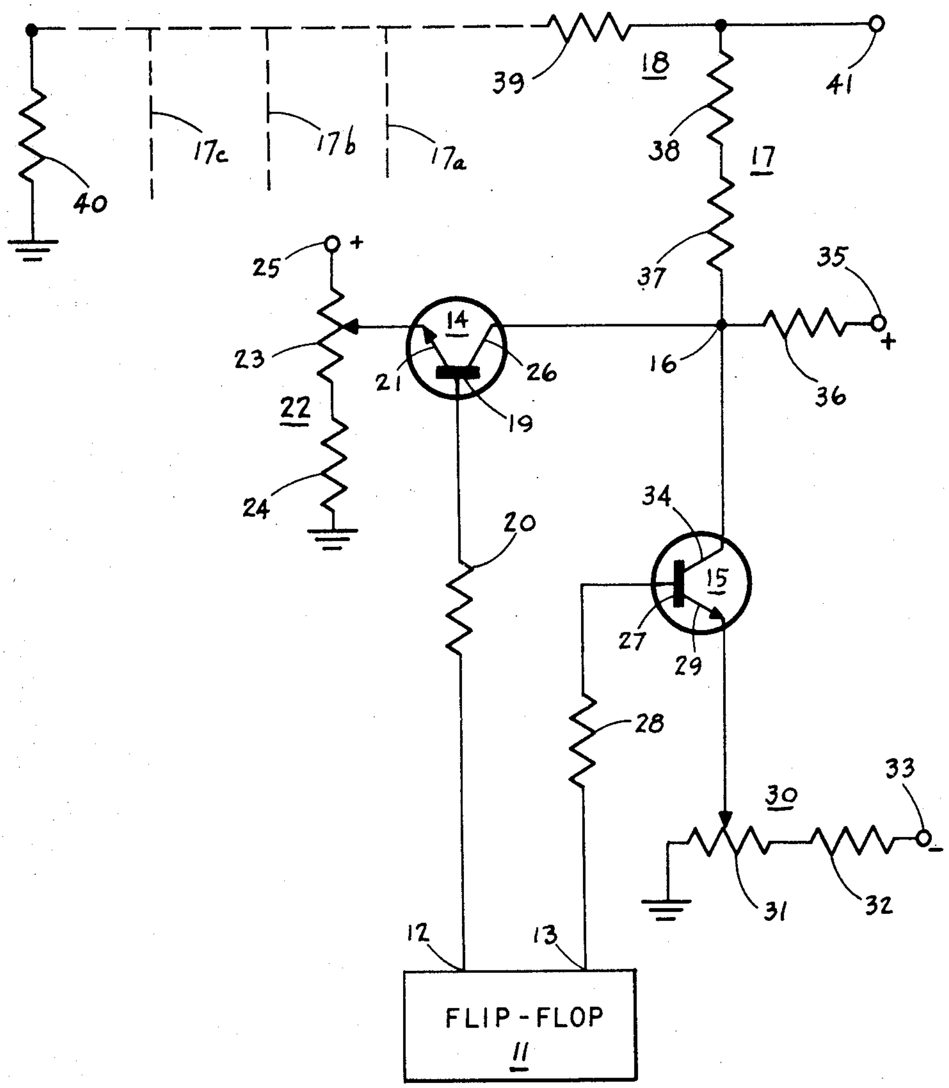
INVENTORS
EDMUND U. COHLER
JOSEPH E. MONAHAN
BY F. I. Sullivan
ATTORNEY United States Patent Office 2,956,272
Patented Oct. 11, 1960

2,956,272

DIGITAL TO ANALOG CONVERTER

Edmund U. Cohler, Brookline, and Joseph E. Monahan, Framingham, Mass., assignors, by mesne assignments, to Sylvania Electric Products Inc., Wilmington, Del., a corporation of Delaware Filed Sept. 12, 1957, Ser. No. 683,541

5 Claims. (Cl. 340—347)

This invention is concerned with data processing equipment, and particularly with digital to analog converters useful in electronic computers.

In many cases it is advantageous for a digital computer to activate external devices requiring a voltage whose magnitude is proportional to a number contained in a computer register. In electronic computers this register may consist of a series of "flip-flops" with one voltage level of each representing the "zero" and another voltage level the "one" of a binary mathematical system, there being as many flip-flops as there are digits per number. In order to obtain a voltage proportional to the complete number, a digital to analog converter is employed.

A classic type of converter comprises a resistor ladder or network having a voltage input for each digit of the number concerned, and a single output representative of the numerical value of the total input. Such circuits have been employed, for example, in a numerically operated milling machine at Massachusetts Institute of Technology and are described in the publication "Numerical Control of Machine Tools" published by the Servomechanism Laboratory of MIT, in 1954.

In these converters the input for each stage of the ladder takes on one of two values, determined by the condition of the flip-flop controlling the input to the stage. If flip-flops with voltage levels of sufficient accuracy were available, the output of the flip-flops could be used directly as the input to the ladders. In the absence of satisfactory accuracy, the flip-flops are used instead to activate switches which control the input of a standard voltage of predetermined level from an independent supply.

A common way of providing the switching for this type of input is with relays. This method has the merit of considerable accuracy and is quite satisfactory where space, speed and cost are not vital considerations. In many instances, however, the installations should be as compact and economical as possible, and also permit the analog output to change at microsecond frequencies.

In order to overcome the drawbacks of relays, attempts have been made to employ semi-conductor diode gates, switched by either vacuum tubes or transistors. This method offers the advantages of economy in size and cost and has sufficient speed potentiality. However, because of the limited voltage capabilities of the switching diodes and transistors and the relatively large voltage drop (e.g. 250 mv.) of the output diodes, their accuracy is severally limited; and, in addition to the deficiencies inherent in these devices themselves, there are differences in the characteristics of the diodes and transistors of different manufacturers, and even different units of the same manufacturer, as well as variations in voltage drop, etc. of the same diode or transistor under different temperature conditions.

Accordingly, the principal object of this invention is to provide an improved digital to analog converter and, particularly, one which will be more economical of size and cost and more accurate and efficiently stable at extremely high operating frequencies and under replacement and temperature changes than those of the prior art. A more specific object is to provide an improved switching circuit useful in digital to analog converters and similar devices.

With these objectives in mind, the invention is featured by the use of a saturated transistor as a no gain switch to control an input reference voltage to an impedance network in a manner responsive to the binary intelligence of a flip-flop circuit.

Other objects and applications will be apparent from the following description of a preferred embodiment of the invention and reference to the accompanying drawing, the single figure of which is a schematic diagram of a portion of the transistor switching circuit and associated ladder network of a digital to analog converter.

The converter illustrated comprises a flip-flop circuit 11 having two output terminals 12 and 13, respectively connected to separate transistor 14 and 15. The transistors have a common output terminal 16 which is connected to their respective collectors and to leg, or phase, 17 of resistor ladder network 18.

Transistor 14 has its base 19 connected, through resistor 20, to terminal 12 of flip-flop 11. Its emitter 21 is coupled to voltage divider 22, comprising resistors 23 and 24 serially connected between a constant level positive potential at terminal 25 and ground. Its collector 26 is connected to the common output terminal 16.

Transistor 15 has its base 27 connected through resistor 28, to terminal 13 of flip-flop 11. Its emitter 29 is connected to voltage divider 30, comprising resistors 31 and 32 serially connected between a negative voltage source at terminal 33 and ground. The collector 34 of this transistor is connected to the output terminal 16, to which is also applied a positive voltage for both transistors 14 and 15 from terminal 35 through resistor 36.

The output terminal 16 is connected to leg 17 of the ladder 18. This leg comprises serially connected resistors 37 and 38, and is connected, through resistor 39, to other similar legs **17*a*, 17*b*, 17*c*, etc., and through resistor 40, to ground. The output of the ladder is derived at terminal 41. Only the flip-flop and switching circuit connected to leg 17** is shown, but it is to be understood that a similar flip-flop and transistor switch is to be provided for each of the other legs, and there may be as many legs as digits in the number to be converted.

The following values and commercial identities have given satisfactory performance in the circuit described.

| | |
|---|---|
| Transistor **14** and **15** | 2N94. |
| Resistor **20** | 2.7K. |
| Resistor **23** | 2Ω. |
| Resistor **24** | 1K. |
| Voltage at **25** | 10 v. (constant). |
| Resistor **28** | 5.6K. |
| Resistor **31** | 2Ω. |
| Resistor **32** | 2K. |
| Voltage at **33** | —20 v. |
| Voltage at **35** | +20 v. |
| Resistor **36** | 10K. |
| Resistors **37**, **38**, **39**, **40** | 25K (1% compensated). |

In a binary to analog converter, this circuit is used to switch a constant level voltage applied at terminal 25 to terminal 16, whence it is applied across leg 17 of the ladder 18, under control of flip-flop 11 which applies a positive signal to terminal 12 and a negative signal to terminal 13 to indicate binary "1," and vice-versa to indicate binary "0." The full voltage from terminal 25 is applied to leg 17 for binary "1" and no voltage for binary "0." Thus, the "1" or "0" condition of the flip-flop representing each digit is converted to a representative voltage drop across an input leg of ladder 18. The total voltage output of the ladder 18, taken at terminal 41, includes the cumulative drop across legs 17*a*, 17*b*, 17*c*, etc., and is representative of the total number or combination of digits to be converted. A more detailed description of the operation of the circuit follows.

A satisfactory bi-level output for flip-flop 11 is a positive 20 volts at one terminal and a negative 4.5 volts at the other terminal. That is, when the circuit is to indicate binary "0," a positive 20 volts exists at terminal 13 and is applied via resistor 28 to the base 27 of transistor 15. With the values given above for the circuit elements involved, this produces a base current in transistor 15 of approximately 4 ma. which is sufficient to saturate the transistor thereby to limit the collector to emitter voltage drop to approximately 2 millivolts. Thus, there is an effective short circuit from output terminal 16 to ground for the voltage applied at terminal 35, with the consequence that no voltage is applied to leg 17 of network 18. The voltage divider 30 permits compensation for variations in collector to emitter voltage drop for different transistors. While transistor 15 is in this saturated condition, transistor 14 is cut off by the negative back bias of approximately −4.5 volts existing at the other terminal 12 of the flip-flop circuit.

When the circuit is to indicate binary "1," the condition of the flip-flop 11 is changed; i.e., in the present illustrative example, a signal of 20 volts positive appears at terminal 12, and a signal of 4.5 volts negative appears at terminal 13. With the circuit values given, the 20 volts positive appearing at terminal 12, applied to the base 19 of transistor 14, produces a base current of approximately 4 ma., thereby saturating the transistor. Collector-to-emitter current flows from terminal 35; and, due to the effective short circuit through transistor 14 the potential (a constant +10 volts), at terminal 25 appears at output terminal 16 with a voltage drop of approximately only about 2 millivolts. The voltage divider 22, similar to divider 30 for transistor 15, provides compensation for variations in emitter to collector voltage drop among different transistors due to minor differences in internal resistance, which under the conditions described is approximately one ohm. If extreme precision is not desired, these dividers can be eliminated and the emitters connected directly to their reference voltage.

While transistor 14 is thus acting as a switch to apply the constant level 10 volts at terminal 25 to output 16, transistor 15 is cut off by the negative back bias from the low level output at terminal 13 of flip-flop 11 applied to its base 27.

The output signal at terminal 16 (an accurate 10 volts positive, or zero, depending on the condition of the switching transistors in response to the binary information from the flip-flop) is applied to leg 17 of the resistor ladder network 18. Here, it contributes to the cumulative output at 41 which is representative of the total numerical value to be converted.

As explained previously, this type of output ladder is well known in the art and has been used, with certain limitations, for the same general purpose. With the input (E) to leg 17, which represents the most significant digit, at 10 volts to express binary "1," the output contributed by the leg 17 is $$\frac{E}{2}$$

or 5 volts. There is no voltage contribution if the flip-flop is indicating binary "0" because there is no potential at terminal 16.

At leg 17*a*, representing the next most significant digit, the voltage contribution is $$\frac{E}{4}$$

or nothing, depending upon whether its associated circuit is representing binary "1" or "0." Similarly, the network leg representing each successive digit in decreasing order of significance contributes to the total output at 41 one half the contribution of its immediately preceding leg, e.g.

$$\frac{E}{8}$$

for 17*b*, $$\frac{E}{16}$$

for 17*c* etc., if the leg concerned represents binary "1," and nothing if it represents binary "0." If all of the digits read "1," the total output at 41 will approximate 10 volts. The function of the network follows the formula $$E\text{ out}=K\sum_{i=0}^{n}E_i\left(\frac{1}{2}\right)^i$$

with $E_i$ representing the input to each leg.

A specific embodiment of the invention has been described, and specific values have been disclosed for various elements. These are suggested for operation in the illustrative example and for the purpose described, and are not to be taken as limitations on the invention itself which is to be given the scope of the appended claims.

What is claimed is:

1. A circuit for converting digital information represented by the differing voltage levels at the two output terminals of each of a plurality of flip-flop circuits, corresponding to the number of digits to be converted, to an analog representation, which includes an impedance network having an input phase for each flip-flop circuit and an output terminal, said network being arranged to produce at said output terminal a voltage representative of the analog value of the cumulative voltages applied to the individual phases, and switching circuit means connecting each of said flip-flop circuits to its respective phase wherein each of said switching circuits comprises: first and second transistors each having base, collector and emitter electrodes; means respectively connecting the bases of said first and second transistors to one and the other output terminals of said flip-flop circuit; means connecting the collectors of both said transistors to said respective input phase; a first voltage divider connected between a source of positive voltage and ground; a second voltage divider connected between a source of negative voltage and ground; means respectively connecting the emitters of said first and second transistors to variable points on said first and second voltage dividers; and, a source of positive reference voltage resistively connected to the collectors of both said transistors.

2. A circuit for converting digital information represented by differing voltage levels at the two output terminals of each of a plurality of flip-flop circuits, corresponding to the number of digits to be converted, to an analog representation which includes an impedance network having an input phase for each digit representing flip-flop and arranged to produce at a common output a voltage representative of the numerical value of the total voltages applied to the individual phases and individual means for switching a reference voltage to each of said phases in accordance with the digital information of its respective flip-flop, wherein each individual switching means comprises means including a first voltage divider for providing said reference voltage, an output terminal connected to one of said network input phases, and to which said reference voltage is applied under control of one of said flip-flops, first and second transistors each having base, emitter and collector electrodes, a first impedance serially connected between the base of said first transistor and one output terminal of said one flip-flop, a second impedance serially connected between the base of said second transistor and the other output terminal of said one flip-flop, variable resistance means connecting the emitter of said first transistor to said first voltage divider, a second voltage divider connected between a source of negative voltage and ground, variable resistance means connecting the emitter of said second transistor to said second voltage divider, means connecting the collectors of both of said transistors to said output terminal, and a source of positive voltage resistively connected to both of said collectors, the parameters of the voltages and impedances connected to said transistors being such as to cause saturating current to flow in each of said transistors when a flip-flop output terminal to which it is connected produces the more positive of said differing voltages.

3. An electronic digital to analog converter which comprises a two terminal output flip-flop circuit for each digit to be converted, an impedance network having an input phase for each digit to be converted and a common output impedance, said network being arranged to produce across said common output impedance a voltage representative of the total of the voltages applied to the individual phases, a plurality of switching means each connecting one of said digit-representing flip-flops to its corresponding impedance network input phase, each of said switching means including first and second transistors each having base, emitter and collector electrodes, resistor means respectively connecting the bases of said first and second transistors to one and the other output terminals of said one flip-flop, a first voltage divider connected between a positive voltage reference point and a relatively negative voltage reference point, a second voltage divider connected between a negative voltage reference point, and a relatively positive voltage reference point, means respectively connecting the emitter of said first and second transistors to said first and second voltage dividers, resistor means connecting the collectors of both of said transistors to a source of positive voltage, and means connecting both of said collectors to one of said impedance network input phases, the parameters of the individual impedance and voltage elements of said switching means being such as to cause saturating current to flow in said transistors when they are conducting.

4. An electronic digital to analog converter which comprises: a plurality of two output-terminal bistable signal devices for representing digital information; an impedance network having a plurality of input legs corresponding to the number of said bistable devices, each leg comprising at least one impedance element; said network having an output terminal and being capable of providing at said output terminal an analog electrical representation of the cumulative electrical signals applied to its respective input legs; an input terminal connected to each of said legs; and, means connected between each of said input terminals and one of said bistable devices for applying to each terminal a precise binary electrical indication of the digital condition of its respective bistable device, each of said means including: a first source of reference potential; a second source of reference potential; first and second transistors, each having emitter, collector and base electrodes; said first transistor having its emitter-collector circuit serially connected between said source of first reference potential and one of said input terminals; said second transistor having its emitter-collector circuit serially connected between said source of second reference potential and said same input terminal; and, means connecting one output terminal of said bistable device to the base of said first transistor and the other output terminal of said device to the base of said second transistor.

5. An electronic circuit which comprises: a plurality of two output-terminal bistable devices; an impedance network including a plurality of input legs and a common output terminal, each leg corresponding to one of said devices and having an input terminal connected through at least one impedance element to said common output terminal; and, a plurality of means connecting each of said bistable devices to one of said input terminals, each of said means including: a first source of reference potential; a second source of reference potential; first and second transistors, each having emitter, collector and base electrodes; said first transistor having its emitter-collector circuit serially connected between said source of first reference potential and one of said input terminals; said second transistor having its emitter-collector circuit serially connected between said source of second reference potential and said same input terminal; and, means connecting one output terminal of said bistable device to the base of said first transistor and the other output terminal of said device to the base of said second transistor.

References Cited in the file of this patent

UNITED STATES PATENTS

| | | |
|---|---|---|
| 2,594,449 | Kucher | Apr. 29, 1952 |
| 2,627,039 | MacWilliams | Jan. 27, 1953 |
| 2,816,237 | Hageman | Dec. 10, 1957 |
| 2,831,986 | Summer | Apr. 22, 1958 |
| 2,838,675 | Wanlass | June 10, 1958 |
| 2,873,367 | Zawels | Feb. 10, 1959 |
| 2,892,103 | Scarbrough | June 23, 1959 |